United States Patent
Skjøth-Rasmussen et al.

(10) Patent No.: US 9,393,552 B2
(45) Date of Patent: Jul. 19, 2016

(54) REFORMING CATALYST

(71) Applicant: Haldor Topsøe A/S, Lyngby (DK)

(72) Inventors: Martin Skov Skjøth-Rasmussen, Kokkedal (DK); Fernando Morales Cano, Copenhagen Ø (DK); Jens-Henrik Bak Hansen, Frederiksberg (DK); Martin Østberg, Roskilde (DK); Thomas Sandahl Christensen, Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/552,594

(22) Filed: Nov. 25, 2014

(65) Prior Publication Data
US 2015/0080212 A1 Mar. 19, 2015

Related U.S. Application Data

(62) Division of application No. 13/583,597, filed as application No. PCT/EP2011/001364 on Mar. 18, 2011, now Pat. No. 8,916,492.

(51) Int. Cl.
*B01J 23/40* (2006.01)
*B01J 23/89* (2006.01)
(Continued)

(52) U.S. Cl.
CPC ............ *B01J 23/8946* (2013.01); *B01J 23/892* (2013.01); *B01J 35/008* (2013.01); *B01J 35/026* (2013.01); *B01J 37/0203* (2013.01); *B01J 37/0205* (2013.01); *C01B 3/40* (2013.01); *B01J 21/005* (2013.01); *B01J 21/04* (2013.01); *C01B 2203/0244* (2013.01);
(Continued)

(58) Field of Classification Search
CPC .... B01J 23/8946; B01J 23/892; B01J 35/008; B01J 35/026; B01J 37/0205; B01J 37/0203; B01J 21/04; C01B 3/40; C01B 2203/062; C01B 2203/068; C01B 2203/1064; C01B 2203/1017; C01B 2203/0244; C01B 2203/0261; C01B 2203/1058
USPC ........................... 502/327, 373, 326; 272/373
See application file for complete search history.

(56) References Cited

U.S. PATENT DOCUMENTS 4,104,201 A 8/1978 Banks et al.
5,814,112 A 9/1998 Elliott et al.
(Continued)

FOREIGN PATENT DOCUMENTS

CN 101180237 A 5/2008
CN 101257971 A 9/2008
(Continued)

OTHER PUBLICATIONS

L. Zhou et al., "Self-Activation and Self-Regenerative Activity of Trace Ru-Doped Plate-Type Anodic Alumina Supported Nickel Catalysts in Steam Reforming of Methane," *Catalysis Communications*, vol. 10, pp. 325-329, 2008.
(Continued)

*Primary Examiner* — Colleen Dunn
*Assistant Examiner* — Haytham Soliman
(74) *Attorney, Agent, or Firm* — Blank Rome LLP

(57) ABSTRACT

An egg-shell catalyst consisting of an active compound in the form of an alloy of nickel and one of iridium, rhodium and ruthenium, on a support comprising alumina, zirconia, magnesia, titania or combinations thereof. The catalyst is used in a process for the steam reforming of hydrocarbons.

8 Claims, 5 Drawing Sheets

(51) Int. Cl.
  *B01J 35/00* (2006.01)
  *B01J 35/02* (2006.01)
  *B01J 37/02* (2006.01)
  *C01B 3/40* (2006.01)
  *B01J 21/00* (2006.01)
  *B01J 21/04* (2006.01)

(52) U.S. Cl.
  CPC .. *C01B 2203/0261* (2013.01); *C01B 2203/062* (2013.01); *C01B 2203/068* (2013.01); *C01B 2203/1017* (2013.01); *C01B 2203/1058* (2013.01); *C01B 2203/1064* (2013.01)

(56) References Cited

U.S. PATENT DOCUMENTS

| | | | |
|---|---|---|---|
| 6,409,940 | B1 | 6/2002 | Gaffney et al. |
| 2004/0192792 | A1 | 9/2004 | Espinoza et al. |
| 2014/0332727 | A1 | 11/2014 | Farnell et al. |

FOREIGN PATENT DOCUMENTS

| | | |
|---|---|---|
| EA | 200702597 A1 | 4/2008 |
| EP | 0 052 894 A1 | 6/1982 |
| WO | WO 01/28678 A1 | 4/2001 |
| WO | WO 2007/015620 A1 | 2/2007 |
| WO | WO 2010/029323 A1 | 3/2010 |

OTHER PUBLICATIONS

T. Miyata et al., "Promoting Effect of Ru on Ni/Mg(Al)O Catalysts in DSS-Like Operation of $CH_4$ Steam Reforming," *Catalysis Communications*, vol. 8, pp. 447-451, 2007.

S. Specchia et al., "Effect of the Catalyst Load on Syngas Production in SCT-CPO Reactors," *Industrial & Engineering Chemistry Research*, vol. 49, No. 3, pp. 1010-1017, Feb. 3, 2010.

Y, Qiu et al., "A Simple Preparation Method of Eggshell Ni/MgO-$Al_2O_3$ Catalyst for Partial Oxidation of Methane," *Reaction Kinetics and Catalysis Letters*, vol. 94, No. 1, pp. 149-155, Nov. 12, 2008. (Abstract Only).

(A)

(B)

REFORMING CATALYST

This is a divisional of application Ser. No. 13/583,597, filed Sep. 7, 2012, which is a 371 of International Application No. PCT/EP2011/001364, filed Mar. 18, 2011, which claims priority to Denmark Application No. PA 2010 00225, filed Mar. 19, 2010 and Denmark Application No. PA 2010 00384, filed Apr. 29, 2010, the disclosures of which are incorporated by reference in their entireties herein.

BACKGROUND OF THE INVENTION

1. Field of the Invention

The present invention relates to an improved catalyst for steam reforming processes such as tubular reforming, heat exchange reforming, catalytic partial oxidation (CPO), autothermal reforming and secondary reforming. The invention concerns also a method of preparation of the catalyst and process for reforming using the catalyst. More particularly, the invention relates to a reforming catalyst for use in autothermal reforming (ATR) or catalytic partial oxidation (CPO) processes.

2. Description of the Related Art

As used herein, autothermal reforming (ATR) encompasses all variations of this technology, including air and oxygen fired secondary reforming. The term secondary reforming is normally used when the resulting synthesis gas is used as ammonia synthesis gas. The present invention mainly focuses on oxygen-blown autothermal reforming. However, what it is presented here is of use also for air-blown autothermal reforming and catalytic partial oxidation (CPO). Typically, air-blown autothermal reforming is used in ammonia plants and in general the operating conditions of the autothermal reformer are less demanding because of the moderating effect of nitrogen in the air and higher steam-to-carbon ratios.

The production of synthesis gas from natural gas, oil, coal, coke, naphta and other carbonaceous resources is typically carried out via steam reforming, autothermal reforming, catalytic partial oxidation or gasification reactions. The synthesis gas (syngas) contains hydrogen, carbon monoxide, carbon dioxide and water as the major components.

The use of autothermal reforming technology for the treatment of process gas which has partially been reformed upstream is well established. The partially reformed gas results normally from the treatment of hydrocarbon feeds which have been passed through tubular reformers or heat exchange reformers. Natural gas feeds may also be directly passed through the autothermal reformer, optionally after the feed gas has passed through an adiabatic prereformer.

In an autothermal reformer (ATR), pre-heated hydrocarbon feedstock is subjected to exothermic internal combustion with oxygen, i.e. partial oxidation, followed by endothermic steam reforming of the partially oxidized feedstock in a fixed bed of catalyst. The chemical reactions within this type of reformer are combinations of combustion and steam reforming reactions. The ATR consists roughly of a refractory-lined pressure vessel, a combustion chamber and a fixed bed of catalyst. A burner mounted on top of the reactor provides for the mixing of a pre-heated hydrocarbon feed stream, such as a methane-rich stream, together with an oxygen containing stream, such as air or mixture of oxygen/steam. Oxygen may be supplied in substoichiometric amounts (less than it is required for full combustion of the hydrocarbon feed) and flame ignition reactions of the hydrocarbon feed take place in the combustion chamber located in the upper portion of the reactor. The combustion chamber is defined by the region in between the burner at the top of the reactor and the fixed bed(s) of catalyst and may also comprise a region where further conversion of the hydrocarbon feed occurs due to homogeneous gas-phase reactions. The final hydrocarbon conversion takes place by heterogeneous catalysis in one or more fixed beds of suitable catalyst arranged in the lower portion of the reactor.

The flame ignition reactions representing the partial oxidation of hydrocarbon feedstock are highly exothermic, while the final hydrocarbon conversion in the fixed bed of catalyst is endothermic and is conducted in the presence of for example steam. The exothermic reactions provide for the heat necessary for the endothermic catalytic steam reforming. In an autothermal reformer typical temperatures of the process gas leaving the combustion chamber are in the range 800-1600° C., more specifically in the range 900-1400° C. The gas cools by means of the endothermic steam reforming reaction in the catalyst bed to 850-1100° C. In the region above the fixed bed of catalyst peak flame temperatures of 2000-3500° C. may be achieved. The actual temperatures may vary depending on for instance whether the reactor is air-blown or oxygen-blown.

Steam reformers such as tubular reformers, heat exchange reformers, catalytic partial oxidation (CPO) reformers and particularly autothermal reformers are normally operated with nickel based catalysts (nickel as the only metal) of determined shapes such as ring shaped catalysts. Unfortunately, because of the severe conditions prevailing in these reformers, particularly in autothermal reformers, we have observed that there may be nickel depletion at the geometrical surface of the catalyst bodies as well as nickel sintering and thereby loss of effective catalytic surface area. Overall the catalyst looses stability and activity over time.

More specifically, problems related to particularly ATR operation include vaporization of nickel and rapid nickel sintering. Nickel volatilization seems to be the result of nickel particles from the reforming catalyst reacting with steam according to $Ni(s)+H_2O=Ni(OH)_2 (g)$.

In addition, the autothermal reformer is refractory-lined, and the catalyst bed is protected by a layer of refractory tiles. A key aspect is to maintain a low pressure drop across the catalyst bed to eliminate the risk of gas bypass into the refractory lining leading to hot spots on the reactor shell. The refractory materials are based on alumina and small amounts of alumina evaporate from these materials at the high temperature in the combustion chamber according to $Al_2O_3(s)+2H_2O (g)=2 Al(OH)_3 (g)$. This alumina vapour then condenses (or solidifies or deposits) on the catalyst which is kept relatively cool by the endothermic reforming reaction. As a result there is a gradual lowering of the void of the catalyst that leads to increasing pressure drop over the catalyst bed.

US 2005/0089464 discloses a catalyst for partial oxidation based on Rh on alumina and a catalyst for steam reforming based on Ni on alumina. The metal loading is high, i.e. in the range 5-30 wt %.

U.S. Pat. No. 7,230,035 discloses a catalyst provided with a pore blocking layer between the support and catalytic layer by which more than 60% of the active material is in the outer shell, i.e. shows an egg-shell profile. The catalytic active material can be iridium, rhenium or rhodium.

US 2009/0108238 discloses a catalyst for reforming hydrocarbons comprising metals such as platinum, palladium, rhodium, iridium, ruthenium deposited on a support produced from a mixture of low surface area material and high surface area material.

EP-A-1338335 discloses catalysts for hydrocarbon reforming including Ir and Co, or Rh and Co, or Ru and Co, on a support of ceria and alumina. The weight content of Ir or Rh or Ru is about the same as Co. This citation is silent about the use of egg-shell catalysts.

US2007/0238610 discloses fuel reformer catalysts applied as wash coats in foams and monoliths for fuel cell applications. The disclosed catalysts include dual stage catalysts such as 2 wt % Ir-2 wt % Ni on $La_2O_3$ catalyst followed by a catalyst containing Pd or Pt such as 1 wt % Pd-5 wt % Ni. The dual stage catalysts provide higher hydrogen generation than their single-stage counterparts. Where Rh is used, the catalyst consists of Rh, Pt or Pd, and Ni. The addition of Rh is said to improve the catalyst resistance to sulphur poisoning and coke formation. This citation is silent about the use of egg-shell catalysts.

WO-A-9737929 discloses a experimental reactor for conducting partial oxidation reactions involving the use of monoliths with catalyst systems involving the use of Rh in the first catalyst bed and Ru in the second bed, alternatively Rh in the first bed and Ni in the second bed. There is no disclosure of a Rh—Ni or Ir—Ni catalyst system nor the use of egg-shell catalysts.

WO-A-2010078035 describes briefly and broadly the use of Ni—Ir catalysts in ATR applications, in particular a Ni—Ir catalyst with 2.5 wt % Ni and 0.5 wt % Ir with about 0.25 wt % variation for optimization. This citation is silent about the use of egg-shell catalysts.

WO-A-2007/015620 discloses the use of Ru-supported Ni-based catalysts for steam reforming as well as Ir-supported Ni-based catalysts, the former exhibiting superior steam reforming activity. The catalyst is prepared in the form of a powder for which full impregnation of Ru or Ir throughout the particles is expected to be obtained. The citation is thus silent about the use of egg-shell catalysts.

US2008/0265212 discloses sulphur tolerant catalysts for production of synthesis gas and hydrogen via steam reforming at about 500° C. for fuel cell applications. The catalysts are in the form of powders and include Rh—Ni on i.a. ceria-alumina. Since the catalyst is in the form of powder, full penetration of the active metals within the particles is expected. Accordingly, this citation is silent about egg-shell catalysts.

U.S. Pat. No. 5,616,154 discloses broadly the use of Rh and Ru as catalysts on several supports including alumina for converting liquid organic materials at low temperatures and high pressure (300-450° C., above 130 atm) into gas containing methane, carbon dioxide and hydrogen, i.e. methanation. The metals Ir, Pt, and Pd optionally in combination with reduced Ni as second catalyst are also mentioned as a possibility for effectively conducting CO-methanation. Of the tested catalysts none are bimetallic Ir—Ni or Rh—Ni and the methanation process concerned is a completely different field of use than in the present invention.

US 2008/0197323 discloses the use of catalysts in for instance autothermal reforming, where catalytic activity on a first (top) layer is enhanced by using in this layer catalysts with higher geometrical surface area (GSA) than in subsequent layers. The active metal in the catalyst is nickel, which may be replaced by metals including platinum, palladium, iridium, ruthenium and rhodium.

In Nitrogen and Syngas 2010 International Conference, Bahrain Feb. 28-Mar. 3, 2010, p. 97-109, it is broadly suggested to provide the top of a catalyst bed in an autothermal reformer with catalyst bodies having a low GSA in which said bodies have more than one through hole while the lower and major part of the catalyst bed is provided with smaller catalyst bodies having a higher GSA and also containing more than one through hole.

EP-A-0625481 describes a process for high temperature reforming, for instance autothermal reforming, in which the catalyst bed comprises an upper and a lower layer, with the catalysts in the upper layer having reduced activity. The reduced activity is said to be possible by increasing the particle size of the catalyst bodies in the upper layer.

SUMMARY OF THE INVENTION

It is an object of the present invention to provide a catalyst for use in catalytic partial oxidation (CPO) or autothermal reforming (ATR) which has higher activity and is more stable than conventional nickel based catalysts.

It is another object of the present invention to provide a process for catalytic partial oxidation or autothermal reforming with reduced pressure drop across the catalyst bed without reducing catalyst activity.

These and other objects are solved by the present invention.

Accordingly, in a first aspect of the invention a process is provided, the features of which include:
1. Process for the steam reforming of hydrocarbons comprising contacting a feed gas in a catalytic partial oxidation (CPO) reactor or autothermal reformer operating at temperatures in the range 800-1600° C. and pressures of 20-100 bar with an egg-shell catalyst consisting of an active compound in the form of an alloy of nickel and one of iridium, rhodium and ruthenium, on a support comprising alumina, zirconia, magnesia, titania, or combinations thereof.
2. Process according to feature 1, in which the catalyst is cylindrically shaped and has one or more through holes, where the distance from the center to the external surface of the catalyst is 10 to 40 mm, the height of the catalyst is 10 to 40 mm and the diameter of the one or more through holes is 3 to 30 mm.
3. Process according to feature 1 or 2, in which the catalyst is provided in one or more catalyst layers with a void/(external or geometrical surface area)-ratio of 1.0-4.5 $L/m^2$.
4. Process according to feature 3, in which the top layer is of a first type of catalyst with a void/(external- or geometrical surface area)-ratio which is above 3 $L/m^2$ and at least a second layer is of a second type of catalyst with a void/(external or geometrical surface area)-ratio which is below 3 $L/m^2$.
5. Process according to feature 4, wherein the void/(external or geometrical surface area)-ratio of the second type of catalyst is above 2 $L/m^2$.
6. Process according to any of features 1 to 5 comprising at least a further third layer of a third type of catalyst having void/(external or geometrical surface area)-ratio in the range 1.0-4.5.
7. Process according to any of features 1 to 6, in which the active compound is an alloy of nickel and iridium, or an alloy of nickel and rhodium, or an alloy of nickel and ruthenium, wherein the content of iridium or rhodium or ruthenium in the catalyst is in the range 0.01 to 0.5 wt % and the nickel content in the catalyst is 2 to 16 wt %.
8. Process according to any of features 1 to 7, wherein the support comprising alumina is selected from α-alumina, calcium aluminate, magnesium-aluminium spinel, and combinations thereof.
9. Process according to any of features 1 to 8, wherein the active compound is an alloy of nickel and iridium, or nickel and ruthenium, and at least 90 wt % of the iridium or ruthenium in the catalyst is located in an outer shell having a depth of up to 10% from the external surface of the catalyst or up to 10% from the periphery of the one or more through holes of the catalyst.

10. Process according to feature 9, in which the local concentration of iridium or ruthenium in the outer shell is 0.1 to 5.0 wt %.
11. Process according to any of features 1 to 10, wherein the active compound in the catalyst in the form of an alloy of nickel and one of iridium, rhodium and ruthenium has average crystallite size of below 0.1 μm when measured as aged or spent catalyst.
12. Process according to any of features 1 to 11, in which the catalyst is prepared by first providing nickel into the support and in a later step adding iridium or rhodium or ruthenium.
13. Process according to feature 12, in which the catalyst is prepared by impregnating a catalyst consisting of nickel on a support with an aqueous solution of iridium, rhodium or ruthenium, then calcining in air at 400-600° C. and reducing in $H_2$ at 350-600° C., preferably 500-550° C.
14. Process according to feature 13, wherein the impregnation of the catalyst is conducted with an aqueous solution of $IrCl_3.H_2O$ or iridium acetate or $Ru(NO_3)_3NO$ and the support comprises alumina, preferably α-alumina or magnesium-aluminium spinel.
15. Process according to any of features 1 to 14 further comprising withdrawing from the catalytic partial oxidation (CPO) reactor or autothermal reformer a synthesis gas for downstream Fischer-Tropsh synthesis, ammonia synthesis, methanol synthesis and dimethyl ether (DME) synthesis.

As used herein a support comprising alumina encompasses different forms of aluminas such as α-alumina, calcium alumina silicates, calcium aluminates, magnesium-aluminium spinel, and combinations thereof.

The terms support and carrier are used interchangeably.

As used herein, when referring to weight percent (wt %) it is meant weight of the metal alloy with respect to the total weight of the catalyst including the support.

As used herein the term egg-shell catalyst means a catalyst body in which an active metal has a significantly different concentration towards the external surfaces of the catalyst than in the rest of the body. In other words, there is a concentration gradient, or there is a variation of concentration of at least one of the active metals from an external surface of the catalyst body into the catalyst body. For instance, while the concentration of nickel may be constant throughout the catalyst body (nickel is uniformly distributed), the concentration of the other metal of the alloy may vary and is preferably higher towards the external surfaces of the catalyst body. An external surface is a surface on the catalyst which is in direct contact with the main flow of the reactant gas passing through the catalyst bed containing the individual egg-shell catalysts. Accordingly, an external surface can be the surface along the periphery of a through hole in the catalyst, or the surface along the outermost periphery of the catalyst.

We have found that the addition of small amounts of the noble metals Rh, Ir or Ru to supported-Ni catalysts provides substantial benefits to their catalytic activity and lifetime as a result of stabilization of the nickel phase against sintering and volatilization at the high temperatures and high steam pressures, for example, in the ATR reactors. The noble metal plays a role as structural promoter through formation of metal alloys with nickel.

The alloy-particles have slower sintering rates than pure nickel and consequently maintain a larger active surface area during longer times under industrial operation. Furthermore, the alloy-particles from compounds with a lower vapour pressures and hence, are more stable against volatilisation in the form of e.g., $Ni(OH)_2$. As a result there is less nickel loss.

The beneficial effect of noble metals was initially found on Rh-promoted alumina catalysts: Rh-promoted nickel catalysts are much more active than their conventional counterparts, such as nickel catalysts on alumina, calcium aluminates or magnesium-alumina spinel supports. This is due to a much higher dispersion of the active phase: e.g. alloy of Ni—Rh, as well as a suppression of the nickel vaporization close to the outer surface the catalyst rings. The same structural promotion has been demonstrated upon impregnation of small amounts of Ir to conventional nickel based catalysts such as nickel catalysts on alumina or magnesium-alumina spinel supports and after performing aging treatments or catalysts exposed to industrial conditions, i.e. spent catalysts. Without Ir or Rh or Pt or Ru alloy of Ni, the Ni crystals grow and sinter together and the effective surface area decreases resulting in decreased activity. We have seen that not much nickel disappears when it is alloyed with Rh, Ir, Ru or Pt and that the degree of sintering is largely suppressed. Even small amounts of Ir or Rh or Pt or Ru increase the catalytic activity significantly. Hence, the catalysts of the invention show better resistance to deactivation at high temperatures and thereby longer lifetimes.

We have also found that although iridium does not have a higher activity than nickel at the same degree of dispersion, the resulting catalyst in the form of an alloy of nickel and iridium on a support shows a higher activity than any of pure nickel based catalyst or pure iridium based catalyst. Hence, a surprising synergistic effect is established.

In order to ensure an egg-shell profile with higher local concentrations of a metal other than nickel towards the external surface of the catalyst body, the catalyst is first provided with nickel, for instance via impregnation of a carrier comprising alumina, and in a later step Ir or Rh or Ru is added, for instance by subsequent impregnation of an aqueous solution of the metal. Preferably, the catalyst provided with nickel is subjected to drying and calcination prior to subsequently adding Ir or Rh or Ru. The calcination is preferably conducted at 400-600° C. in air, more preferably at 450° C. in air.

We have also found that when using particularly iridium or ruthenium as the noble metal on a support containing alumina such as α-alumina, magnesium aluminium spinel or calcium aluminate, this metal after impregnation on the support does not penetrate all the way into the catalyst body, but rather stays even more on the outer shell of the catalyst body, i.e. towards the external surfaces of the catalyst body. Thus, a much simpler and cheaper way of preparing the novel catalyst is provided, without the need of additional micropore blocking layers as in for instance U.S. Pat. No. 7,230,035. The depth into which the noble metal iridium is located is up to 2000 μm, preferably up to 1000 μm from an external surface of the catalyst, more preferably up to 500 μm, most preferably below 400 μm or about 200 μm. The distance from surface to surface in a ring shaped catalyst (from external surface of catalyst to perimeter of through hole), or total depth is normally 10000 μm.

Accordingly, in a particular embodiment of the invention, the active compound is an alloy of nickel. and iridium, or nickel and ruthenium, and at least 90 wt % of the iridium or ruthenium in the catalyst is located in an outer shell having a depth of up to 10% from an external surface of the catalyst or up to 10% from the periphery of the one or more through holes of the catalyst.

The Ir or Ru species remain close to the outer shell of the catalyst rings reaching local concentrations between 0.1 to 5.0 wt %, often 0.1 and 1.0 wt % at distances from an external surface of 1000 μm or below, particularly below 500 μm or even below 400 μm, and thereby forming egg-shell profiles with a concentration gradient from the surface into the catalyst; the distance from surface to surface or total depth is 10000 μm. The external surfaces of the catalyst bodies, even if the catalyst body as such overall is cylindrically shaped, may be other than circular.

Although at industrial conditions the reactions in the autothermal reformer or CPO occur preferentially in the outer shell of the catalyst bodies, some penetration of the active metal is still desired. We have found, that the best catalysts are those in which at least 90 wt % of the active metal, preferably Ir or Ru, is located within a depth of about 200 μm, for instance 150 to 250 μm, corresponding to about 2%, for instance 1.5-2.5% from an external surface of the catalyst or from the periphery of the one or more through holes of the catalysts, the catalyst preferably being a ring shaped catalyst (one through hole) with a total depth of 1000 μm.

Preferably, when using iridium the impregnation of the catalyst is conducted with aqueous solutions of $IrCl_3 \cdot H_2O$ or $Ir(OAc)x$ (iridium acetate) as precursors. We have namely found that the occurrence of these egg-shell profiles can be ascribed to electrostatic interactions between $IrCl_6^{3-}$ anionic species in solution and the positively charged $Al^-(OH_2)^+$ groups at the $Al_2O_3$ surface or probably even nickel as the other basic species, which prevents Ir penetrating deeper into the catalyst bodies during the pore impregnation. The same mechanism of interaction with the $Al_2O_3$ surface appears to apply when using iridium acetate as precursor for iridium. Iridium acetate is particularly attractive as iridium precursor as it avoids the use of $Cl^-$ containing solutions during the preparation of the catalyst and enables the location of the iridium in the catalyst within layers as thin as 200 μm from the surface or below, such as 150 μm, as shown in the accompanying FIG. 3.

Preferably, when using ruthenium the impregnation of the catalyst is conducted with $Ru(NO_3)_3NO$ or $RuCl_3 \cdot nH_2O$ as precursors. $Ru(NO_3)_3NO$ is particularly attractive as precursor since it enables that the thickness of the outer Ru shell is below 500 μm with Ru concentrations typically varying in the range of 0.3-2.5 wt %. In the case of the $RuCl_3 \cdot nH_2O$, the thickness of the outer Ru shell is typically below 400 μm and the Ru concentrations vary typically within the 0.2-1.5 wt % range, yet some Ru also penetrates deeper into the rings to some extend. For instance, in the $Ru/Al_2O_3$ catalyst prepared with $RuCl_3 \cdot nH_2O$ there is an area at 4000 μm from the outer surface, which contains up to 0.5 wt % Ru, as shown in the accompanying FIG. 4.

The Rh/Ir/Ru (Rh or Ir or Ru) in a fresh nickel based catalyst will during heating, also after start-up, form an alloy penetrating into the nickel particles. While the pure Ni will sinter at a higher rate over time, the noble metal promoted catalyst will sinter at a slower rate and thereby maintain a larger active surface area during longer times with a concomitant increase the lifetime of the catalyst load. We have observed smaller metal particles sizes in the spent catalysts promoted with noble metals compared to the pure nickel based catalysts. The active compound in the form of an alloy of nickel and noble metals has average crystallite size of below 0.1 μm when measured as aged or spent catalyst, whereas catalyst with nickel particles without the noble metals has an average crystallite size of above 0.1 μm, often in the range 0.1-0.8 μm or even larger, as measured by scanning electronic microscope (SEM) analysis.

According to the invention a preferred catalyst showing high activity and stability is a catalyst with a support comprising α-alumina with 2.0 or 3.0 wt % Ni and 0.1 wt % Ir. Thus, in a preferred embodiment the weight ratio Ir/Ni is 1/20 or 1/30, but lower amounts of Ir with respect to Ni are also applicable, such as weight ratios Ir/Ni as low as 1/60. The Rh/Ni weight ratio can also be as low as 1/70. A more preferred range for a support comprising α-alumina is 0.04-0.15 wt % Ir/Rh.

The term Ir/Rh denotes Ir or Rh. The term Rh/Ir denotes Rh or Ir.

The support comprising α-alumina works also with 0.01-0.5 wt % Rh/Ir, but preferably with 0.03-0.5 wt % Rh/Ir.

In another preferred embodiment a support comprising $MgAl_2O_4$ spinel performs well in terms of activity and stability with both 8 wt % Ni and 0.25 wt % Ir/Rh and with 12 wt % Ni and 0.25 wt % Ir/Rh, corresponding to Ir/Ni=1/32 and 1/48, respectively. The support comprising $MgAl_2O_4$ spinel works also with 0.01-0.5 wt % Rh/Ir, preferably 0.03-0.5 wt % Rh/Ir.

As described before the condensation of alumina in the reformer causes the void of the catalyst bed to decrease and thereby the pressure drop over the catalyst bed to increase. The lowering of the void has a dramatic, more than linear, influence as to increasing the pressure drop.

The void is that volume part of the catalyst bed, where the process gas can flow freely not obstructed by the material of the catalyst bodies.

The void of the catalyst bed is for the present purpose defined as the number of litres of the catalyst bed volume that is outside the external or geometrical surface of the catalyst bodies per unit of catalyst bed volume.

The external or geometrical surface area (GSA) of the catalyst bodies is for the present purpose defined as the number of $m^2$ of external or geometrical surface area of the catalyst bodies per unit of catalyst bed volume.

According to the invention the problem of deposition is further mitigated by making more room for the condensation/deposition of alumina by selecting a catalyst, for the top of the catalyst bed with a body shape characterised by a high ratio between void and external or geometrical surface area; i.e. void divided by external or geometrical surface area with a unit of $L/m^2$ resulting from the definitions above. This again leads to that a simple ring shape catalyst body, i.e. a cylinder with one single through hole, is preferred over more advanced shapes with multiple through holes. Hence, in another preferred embodiment of the invention the top layer is of a first type of catalyst with one single through hole.

The above preference will be contrary to the normal first choice for shape of a catalyst body working under conditions characterised by strong pore diffusion restrictions where persons skilled in the art would tend to choose a catalyst body shape with high external or geometrical surface area per unit of catalyst bed. This subject is elucidated by the below table giving key figures on some catalyst body shapes used in autothermal reformers.

It is apparent that contrary to traditional loading schemes in the present invention the top layers containing one single through hole, present the lowest geometrical surface area.

Hence, by combining the use of egg-shell catalysts having nickel and one of iridium, rhodium and ruthenium, with the specific shapes as defined by the void/geometrical surface area, it is possible to limit pressure drop while at the same time at least maintaining catalytic activity and stability in at least the top layer of the catalyst bed.

It would be understood that the term catalyst bed or fixed bed define an agglomeration of catalyst bodies dispersed within the reactor and which results in a bed having a given thickness along the length of the reactor. It would also be understood that a catalyst bed may contain one or more sub-beds or catalyst layers.

| | void/ (external- or geometrical surface area) $L/m^2$ | Void | external- or geometrical surf. area, GSA $m^2/m^3$ | (external- or geometrical surface area)/ (bed volume) $m^2/L$ |
|---|---|---|---|---|
| 7-hole 16*11 mm | 1.07 (1.04) | 0.526 | 504 | 0.50 |
| 7-hole 20*18 mm | 1.38 (1.36) | 0.545 | 401 | 0.40 |
| ring 25/11-20 mm | 2.22 (2.15) | 0.448 | 208 | 0.21 |
| ring 35/16-27 mm | 3.14 (3.07) | 0.462 | 150 | 0.15 |

Ring 25/11-20 mm denotes a ring shaped catalyst (one through hole) with outer diameter 25 mm, inner diameter (through hole diameter) 11 mm and height 20 mm. 7-hole 16*11 mm denotes a catalyst with 7 through holes (or the equivalent of 7 through holes), outer diameter 16 mm, hole diameter 3 mm, height 10 mm.

The values for void/(external or geometrical surface area), for instance 2.22 $L/m^2$ for catalyst particles in the form of rings 25/11-20 mm, are calculated from standard empirical formulae for determination of void, while the values in parenthesis are calculated according to formulae from the open literature.

Particularly, the void values of the table and the values in parenthesis for void/(external or geometrical surface area), for instance 2.15 for catalyst particles in the form of rings 25/11-20 mm, are calculated according to Max Leva's formula for calculation of Void (1. Leva, M.; Chem. Eng. May 115-117 (1949), 2. Leva, Max; Grummer, Milton. "Pressure Drop Through Packed Tubes: Part III Prediction of Voids in Packed Tubes." Chemical Engineering Progress, vol 43, n 12, 713-718. Pittsburgh, Pa.: 1947), in which Void=Void-External+Void-Internal, and Void-External=0.30675+0.6885·(Dp/Dt), where Dp is particle size and Dt is tube or reactor's inner diameter.

Accordingly, the top layer is of a first type of catalyst with a void/(external- or geometrical surface area)-ratio which is above 3 $L/m^2$ and at least a second layer is of a second type of catalyst with a void/(external or geometrical surface area)-ratio which is below 3 $L/m^2$. Preferably, the void/(external or geometrical surface area)-ratio of the second type of catalyst is above 2 $L/m^2$. At these specific conditions, the invention enables, contrary to EP-A-0625481, a reduced pressure drop across the catalyst bed while at the same time being able to maintain or increase catalytic activity not least in the upper layers of the catalyst bed. Accompanying FIG. 5 shows the reduce drop in pressure in an autothermal reformer compared to a traditional loading of catalyst.

At least a further third layer of a third type of catalyst may be provided, wherein said third type of catalyst is freely shaped with adequate effective catalytic activity and pressure drop characteristics to fulfill the reforming conversion and the requirements to start-of-run pressure drop. Such catalysts are preferably catalysts with void/(external or geometrical surface area)-ratio in the range 1.0 to 4.5 $L/m^2$, more preferably catalysts with void/(external or geometrical surface area)-ratio which is below 1.5 $L/m^2$, such as cylindrically shaped catalysts with 7 through holes (or the equivalent of 7 through holes) having a void/(external or geometrical surface area)-ratio in the range 1.0-1.4, specifically 1.36 and 1.04 $L/m^2$ a shown in the above table.

Preferably, the top layer is 5-30% of the total depth of the catalyst bed.

In a second aspect of the invention, the invention also encompasses the catalyst as such.

Hence the invention provides also an egg-shell catalyst consisting of an active compound in the form of an alloy of nickel and one of iridium, rhodium and ruthenium, on a support comprising alumina, zirconia, magnesia, titania or combinations thereof.

Preferably, the content of iridium or rhodium or ruthenium in the catalyst is in the range 0.01 to 0.5 wt % and the nickel content in the catalyst is 2 to 16 wt %.

Preferably, the support comprising alumina is selected from α-alumina, calcium aluminate, magnesium-aluminium spinel and combinations thereof.

Preferably, the catalyst is cylindrically shaped and has one or more through holes, where the distance from the center to the external surface of the catalyst is 10 to 40 mm, the height of the catalyst is 10 to 40 mm and the diameter of the one or more through holes is 3 to 30 mm.

Preferably, the active compound is an alloy of nickel and iridium, or nickel and ruthenium, and at least 90 wt % of the iridium or ruthenium in the catalyst is located in an outer shell having a depth of up to 10% from the external surface of the catalyst or up to 10% from the periphery of the one or more through holes of the catalyst.

Preferably, the local concentration of iridium or ruthenium in the outer shell is 0.1 to 5.0 wt %.

Preferably, the catalyst is prepared by first providing nickel into the support and in a later step adding iridium or rhodium or ruthenium. More preferably, the catalyst is prepared by impregnating a catalyst consisting of nickel on a support with an aqueous solution of iridium, rhodium or ruthenium, then calcining in air at 400-600° C. and reducing in $H_2$ at 350-600° C., for instance at 500-550° C. In other words, the invention encompasses therefore also a method of producing an egg-shell catalyst comprising the steps of: (a) providing nickel into a support comprising alumina, zirconia, magnesia, titania, magnesium-aluminium spinel and combinations thereof; (b) adding one or iridium, rhodium or ruthenium to the catalyst of step (a). Preferably step (a) comprises the step of impregnating the support with nickel and then drying and calcining, where the calcination is preferably conducted at 400-600° C. in air, more preferably at 450° C. in air.

Preferably, the impregnation of the catalyst is conducted with an aqueous solution of $IrCl_3.H_2O$ or iridium acetate or $Ru(NO_3)_3NO$ and the support comprises alumina, preferably α-alumina, or magnesium-aluminium spinel. With these precursors the best concentration gradients of the metals are obtained. While Rh presents a variation in concentration throughout the catalyst bodies but actually peaks away from the external surface of the catalyst, Ir and Ru nicely disperse towards the external surfaces of the catalyst bodies as evidenced in FIGS. 3 and 4.

The catalyst is preferably for use in steam reforming of hydrocarbons such as adiabatic pre-reforming and primary reforming, more preferably for use in the reforming of hydrocarbons in a catalytic partial oxidation (CPO) or autothermal reformer, most preferably for use in the reforming of hydrocarbons in a catalytic partial oxidation (CPO) or autothermal reformer operating at temperatures in the range 800-1600° C. and pressures of 20-100 bar.

DETAILED DESCRIPTION OF THE PREFERRED EMBODIMENTS

Example 1

Catalysts were prepared by obtaining sieve-fractions of 0.42-0.50 mm α-Al$_2$O$_3$ carrier, then pore impregnation of 3.5 wt % Ni followed by drying and calcination at 450° C. in air. Particles within this small size range 0.42-0.50 mm are used to ensure full penetration of the catalytic material and thereby proper measure of catalytic intrinsic activity. Subsequently pore impregnation of the catalysts with aqueous solutions of IrCl$_3$.H$_2$O or Rh(NO$_3$)$_2$ to achieve loadings of 0.05 to 1.0 wt % noble metal (Ir or Rh) was conducted and then drying and calcination at 450° C. in air. A 5% excess volume of precursor solution was applied in the impregnations. The catalysts were subsequently reduced in pure H$_2$ at 525° C.

Aged Catalysts:

Aging experiments were carried out during 10 days at 850° C., 30 barg and H$_2$O/H$_2$(6:1) atmospheres in order to investigate the effect of the Rh and Ir promoters on the nickel sintering as well as the interaction between them.

An overview of the catalysts prepared is shown in the table below:

Samples According to Example 1:

| Sample Code | wt % Ni | wt % noble metal (Rh or Ir) | Ni/Noble metal weight ratio |
|---|---|---|---|
| Ref Ni_3.5 | 3.5 wt % | — | |
| Ni3.5_Ir0.05 | 3.5 wt % | 0.05 wt % Ir | 70 |
| Ni3.5_Ir0.1 | 3.5 wt % | 0.1 wt % Ir | 35 |
| Ni3.5_Ir0.25 | 3.5 wt % | 0.25 wt % Ir | 14 |
| Ni3.5_Ir0.5 | 3.5 wt % | 0.5 wt % Ir | 7 |
| Ni3.5_Ir1.0 | 3.5 wt % | 1.0 wt % Ir | 3.5 |
| Ref Ir_0.25 | — | 0.25 wt % Ir | |
| Ni3.5_Rh0.05 | 3.5 wt % | 0.05 wt % Rh | 70 |
| Ni3.5_Rh0.1 | 3.5 wt % | 0.1 wt % Rh | 35 |
| Ni3.5_Rh0.25 | 3.5 wt % | 0.25 wt % Rh | 14 |
| Ni3.5_Rh0.5 | 3.5 wt % | 0.5 wt % Rh | 7 |
| Ni3.5_Rh1.0 | 3.5 wt % | 1.0 wt % Rh | 3.5 |
| Ref Rh_0.25 | | 0.25 wt % Rh | |

Figure 1:
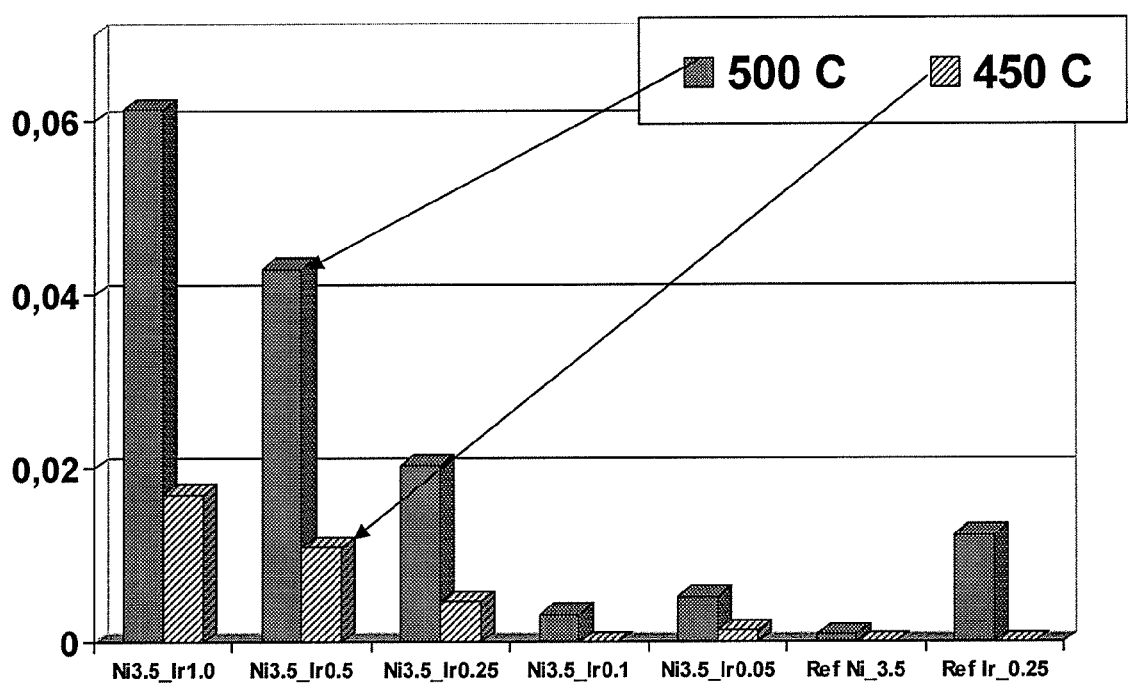
FIG. 1 shows the reforming activity (mol/g/h) of aged Ir-promoted catalysts at 450 and 500° C.

FIG. 1 shows the reforming activity of the aged catalysts with different Ni/Ir weight ratios. It is observed that the reference catalyst containing iridium (Ref Ir_0.25) at 450° C. rapidly deactivates after 1 h reforming reaction leading to complete loss of activity. Yet we find an increase in activity with increasing Ir loading, which is very pronounced due to a synergistic effect obtained upon formation of the Ir—Ni alloys. Iridium plays a role as structural promoter by forming Ni—Ir bimetallic particles, which are more resistant to sintering during the aging treatments. Hence, the activity of the catalysts is largely improved due to a higher metal dispersion in the aged Ir-promoted catalyst than in the reference Ni catalyst. This effect becomes most significant when using Ni/Ir weight ratios below 14.

Figure 2:
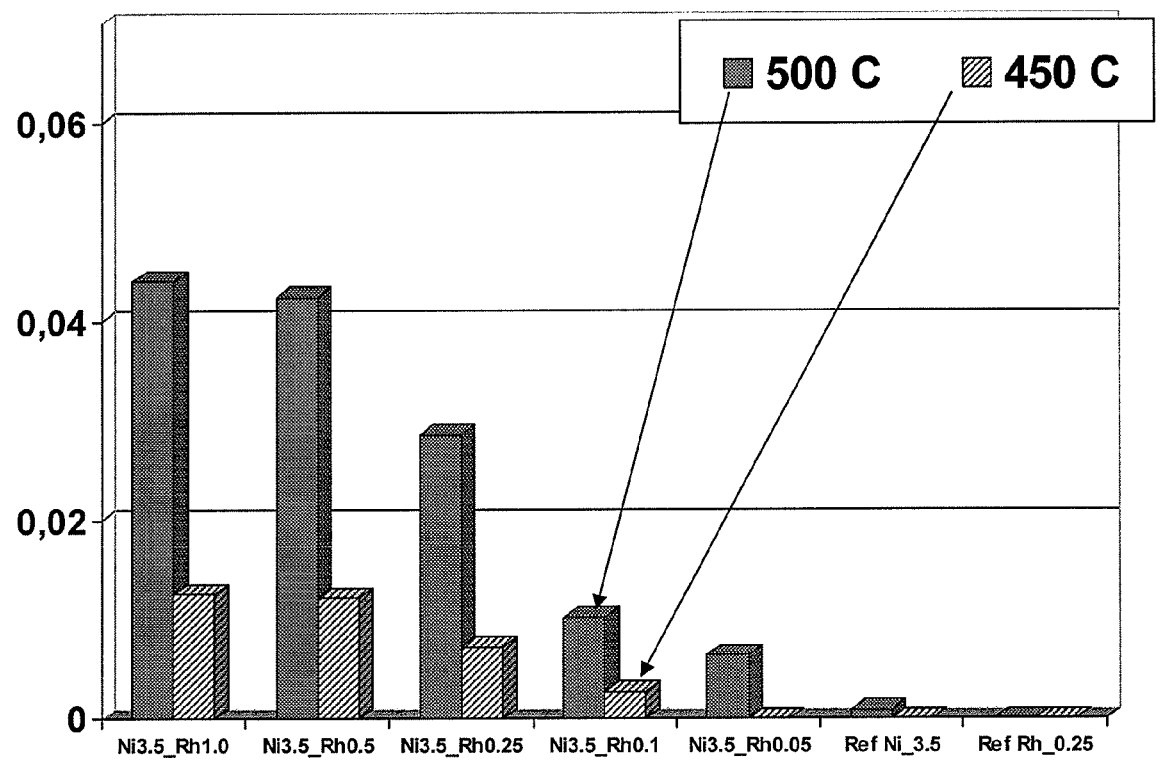
FIG. 2 shows the reforming activity (mol/g/h) of aged Rh-promoted catalysts at 450 and 500° C.

FIG. 2 shows the reforming activity of the aged catalysts with different Ni/Rh weight ratios. The increase in activity with increasing Rh loading is also very pronounced due to a synergistic effect obtained upon formation of Rh—Ni alloys. Rh plays also a role as structural promoter and form Ni—Rh bimetallic particles, which are more resistant to sintering during the aging treatments. Therefore, the activity of the catalysts is largely improved due to a higher metal dispersion in the aged Rh-promoted catalyst than in the reference Ni catalyst. This effect becomes detectable even when using Ni/Rh weight ratios as high as 70.

The above figures show that the use of Rh or Ir in combination with Ni leads to superior reforming catalysts with a higher resistance to sintering and therefore with a longer catalyst lifetime. The increase in activity is, once again, ascribed to a structural promotion obtained through the formation of Ni—Ir and Ni—Rh bimetallic particles.

Rh and Ir are known to be catalytically active in the reforming reaction; in particular Rh is known to be more active than Ni. The increase in activity, however, is attributed to the increase in metal dispersion achieved after the aging treatments. The promotion effect is therefore obtained during the aging treatment upon formation of Rh—Ni alloy particles which sinter at a lower rate than pure nickel particles.

Example 2

Figure 3:
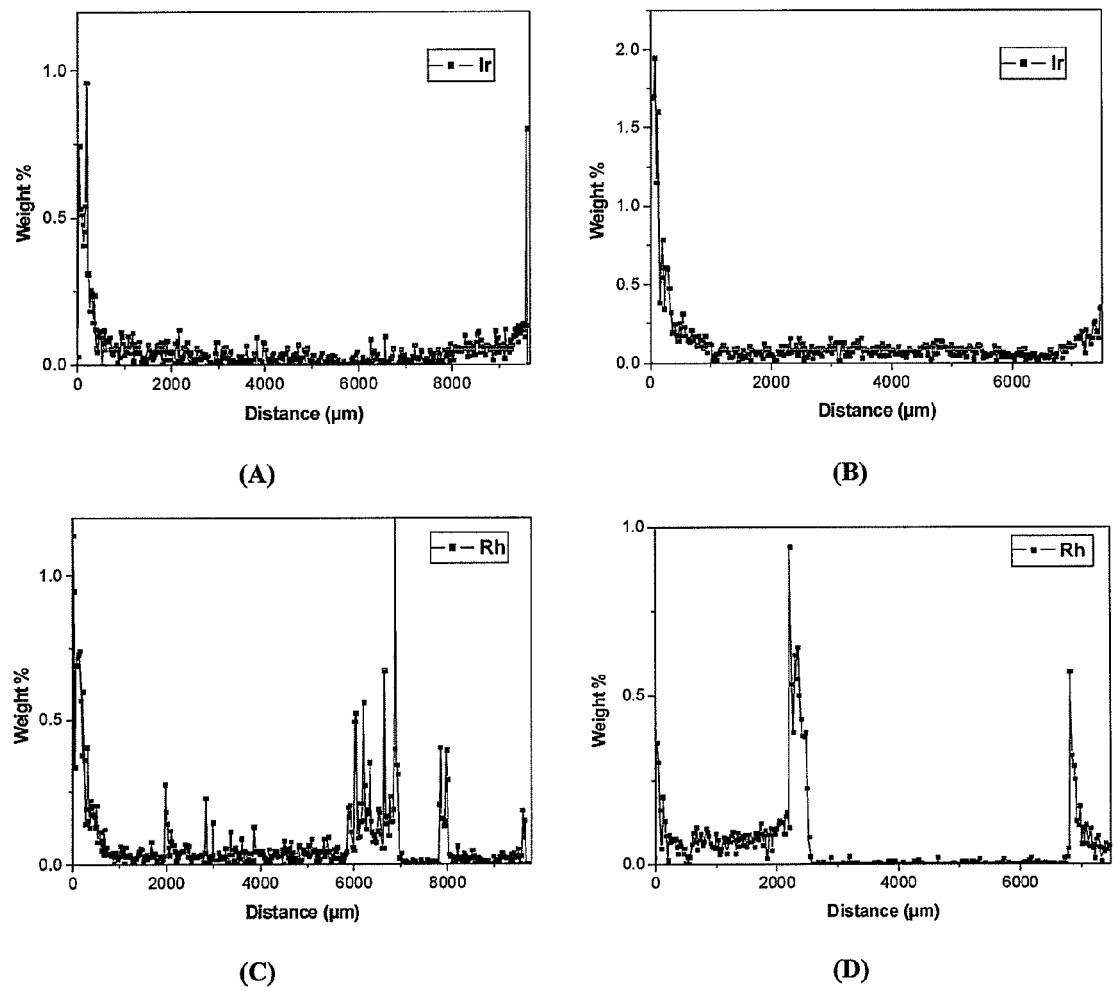
FIG. 3 shows microprobe line scans measured along the cross-section of the nickel on α-alumina_Ir0.1 (A), nickel on magnesium-aluminium spinel_Ir0.1 (B), nickel on α-alumina _Rh-0.1 (C) and magnesium-aluminium spinel_0.1 (D); catalyst rings from outer to inner surface (from external surface of catalyst to outer surface of through hole of catalyst). The rings were measured in the aged state. X-axis: distance in μm from external surface of catalyst to external surface of through hole of catalyst, Y-axis: wt % of iridium (A, B) or rhodium (C, D).

The distribution of Ir and Rh along the cross-sections of the rings was studied by WDS analysis (wave-length dispersive spectroscopy). FIG. 3 shows some representative examples of line scans measured on the aged nickel catalysts supported on α-alumina and magnesium-aluminium spinel promoted with Ir (FIGS. 3A and 3B) and Rh (FIGS. 3C and 3D).

The Rh-promoted catalysts also present egg-shell profiles. Yet Rh is not only present in the outer shell, i.e. near of or at external surface of catalyst, but also penetrates deeper into the rings. For instance, magnesium-aluminium spinel_Rh0.1 reaches a high Rh concentration at 2000 μm from the outer shell (FIG. 3C). Without being bound by any theory, this is believed to occur due to a weak interaction between [Rh (H$_2$O)$_6$]$^{3+}$ or other cationic species in solution and the Al$_2$O$_3$ carrier. Therefore, an aqueous solution of Rh(NO$_3$)$_2$ is less suitable as precursor since a fraction of the Rh is wasted inside the ring-shaped catalysts.

On the other hand, the Ir species surprisingly remain close to the outer shell of the rings, often below 1000 μm, particularly below 500 μm or below 400 μm, reaching local concentrations between 0.1 and 1.0 wt %. The distance from surface to surface or total depth is as depicted in the FIG. 3 about 10000 μm. Without being bound by any theory, the occurrence of these eggshell profiles are believed to be the result of electrostatic interactions between IrCl$_6^{3-}$ anionic species in solution and the positively charged (OH$_2$)$^+$ groups at the Al₂O₃ surface, which prevents Ir penetrating deeper into the catalyst bodies (ring shaped catalysts) during the pore impregnation.

Similar or even better results are obtained when using of aqueous solutions of Ir acetate (Ir(OAc)x) as Ir precursor, as we also observe egg-shell profiles with very thin layers of below 200 μm.

Similar concentration profiles were obtained for all the aged catalysts.

Example 3

The distribution of Ru along the cross-section of various Ru/Al₂O₃ catalyst rings prepared with different Ru precursors was studied by WDS analysis. FIG. X shows two representative examples of line scans measured on reduced nickel catalysts supported on α-alumina which are subsequently impregnated with 0.1 wt % Ru, either using $Ru(NO_3)_3NO$ (FIG. 4A) or $RuCl_3 \cdot nH_2O$ (FIG. 4B) precursors.

While the average concentration of Ni along the cross-section of the rings remains fairly constant (average 2.5 wt % Ni) both catalysts present a higher Ru concentration at the outer shell, i.e. near of or at external surface of catalyst body. In the case of $Ru(NO_3)_3NO$ precursor, the thickness of the outer Ru shell is typically below 500 μm with Ru concentrations typically varying in the range of 0.3-2.5 wt %. In the case of the $RuCl_3 \cdot nH_2O$, the thickness of the outer Ru shell is typically below 400 μm and the Ru concentrations vary typically within the 0.2-1.5 wt %, range.

Figure 4:
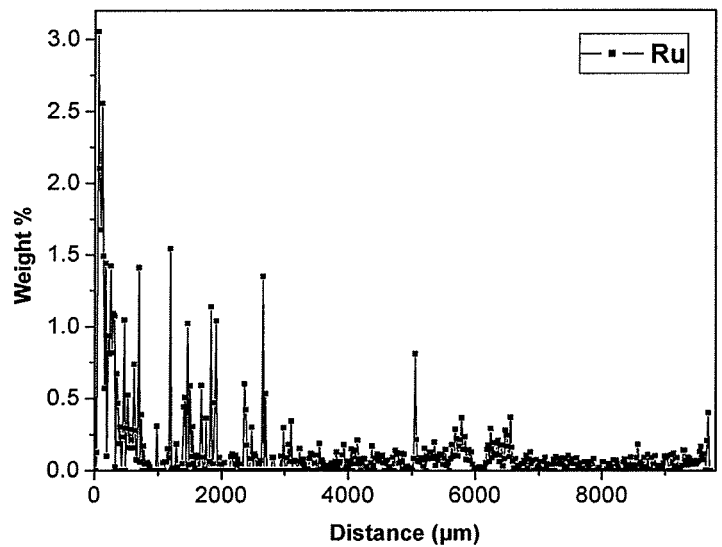
FIG. 4 shows microprobe line scans measured along the cross-section of the nickel on α-alumina impregnated with 0.1 wt % Ru either using [Ru(NO$_3$)$_3$NO](FIG. 4A) or RuCl$_3$.nH$_2$O (FIG. 4B) as precursors; catalyst rings from outer to inner surface (from external surface of catalyst to outer surface of through hole of catalyst). X-axis: distance in μm from external surface of catalyst to external surface of through hole of catalyst, Y-axis: wt % of ruthenium.
Figure 4:
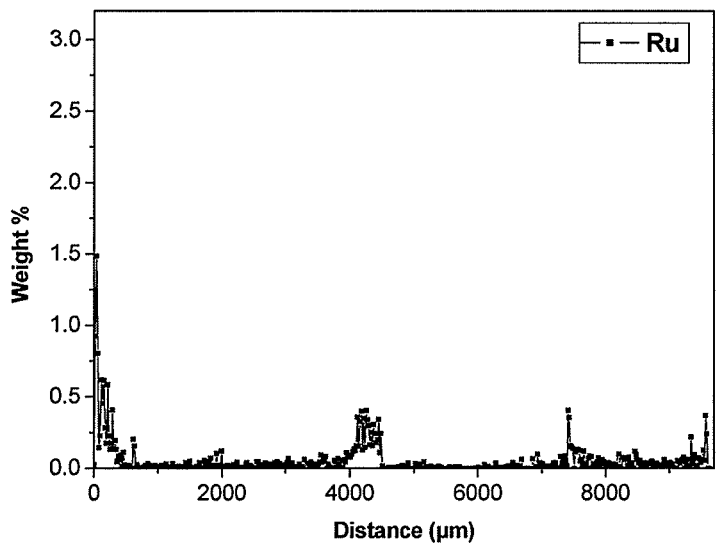

In both cases (especially in the catalyst prepared with $RuCl_3 \cdot nH_2O$) some Ru also penetrates deeper into the rings to some extend. For instance, in the Ru/Al₂O₃ catalyst prepared with $RuCl_3 \cdot nH_2O$ there is an area at 4000 μm from the outer surface, which contains up to 0.5 wt % Ru (FIG. 4B).

Example 4

Calculation of Void/(External or Geometrical Surface Area)

Max Leva's formula for calculation of Void is used (1. Leva, M.; Chem. Eng. May 115-117 (1949), 2. Leva, Max; Grummer, Milton. "Pressure Drop Through Packed Tubes: Part III Prediction of Voids in Packed Tubes." Chemical Engineering Progress. vol 43, n 12, 713-718. Pittsburgh, Pa.: 1947).

Void=Void-External+Void-Internal.

Void-External=0.30675+0.6885(Dp/Dt), where Dp is particle size and Dt is tube or reactor's inner diameter.

If catalysts are cylindrically shaped, Dp is calculated as the equivalent sphere diameter by $Dp=(3/2 \cdot Dcyl^2 \cdot Hcyl)^{1/3}$, where Dcyl is the outer diameter of the cylinder and Hcyl the height.

In the case of ring shaped catalysts (one through hole) or a plurality of through holes in a cylinder shaped catalyst, Internal-Void is calculated according to:

Void-Internal=(1−Void-External)·Nholes·(Dhole/Dcyl)² where Nholes is the number of through holes in the catalyst and Dhole is the through hole diameter.

Total void is thus,

Void=Void-Total=Void-External+Void-Internal

The external or geometrical surface area (GSA) is defined as the number of m² of external or geometrical surface area of the catalyst bodies per unit of catalyst bed volume. GSA has units m²/m³ and is calculated based on the number of bodies (catalyst particles) per volume and a bulk density which is first calculated based on the measurable catalyst material density, normally about 2200 kg/m³. The number of bodies per volume is calculated from the measurable catalyst weight and the bulk density:

Bodies per volume (#/m³)=bulk density/weight of one catalyst body.

bulk density=(1−Void)*(catalyst particle density).

GSA per body=GSAp=π(Dcyl²−Nholes*Dhole²)+ π·Hcyl·(Dcyl+Nholes·Dhole)

GSA is then calculated by:

GSA=(Bodies per volume)*(GSAp)

The calculation of the ratio Void/GSA is then straightforward.

Example for ring shaped catalysts 25/11-20 mm:

Ring 25/11-20 mm denotes a ring shaped catalyst (one through hole, Nhole=1) with outer diameter 25 mm, Dcyl, inner diameter (through hole diameter, Dhole) 11 mm and height (Hcyl) 20 mm.

Catalyst weight (weight of a tablet)=17.4 g
Particle density=2200 kg/m³
Tube ID=2000 mm
Following the above formulae:
Void external=0.316
Void internal=0.132
Void=0.316+0.132=0.448
Bulk density=1188 kg/m³
Tablets per volume=68188/m³
GSAp=30.5 cm²
GSA=30.5*68188/10000=208 m²/m³
Void/GSA=0.448/208*1000=2.15 L/m²

Example 5

Figure 5:
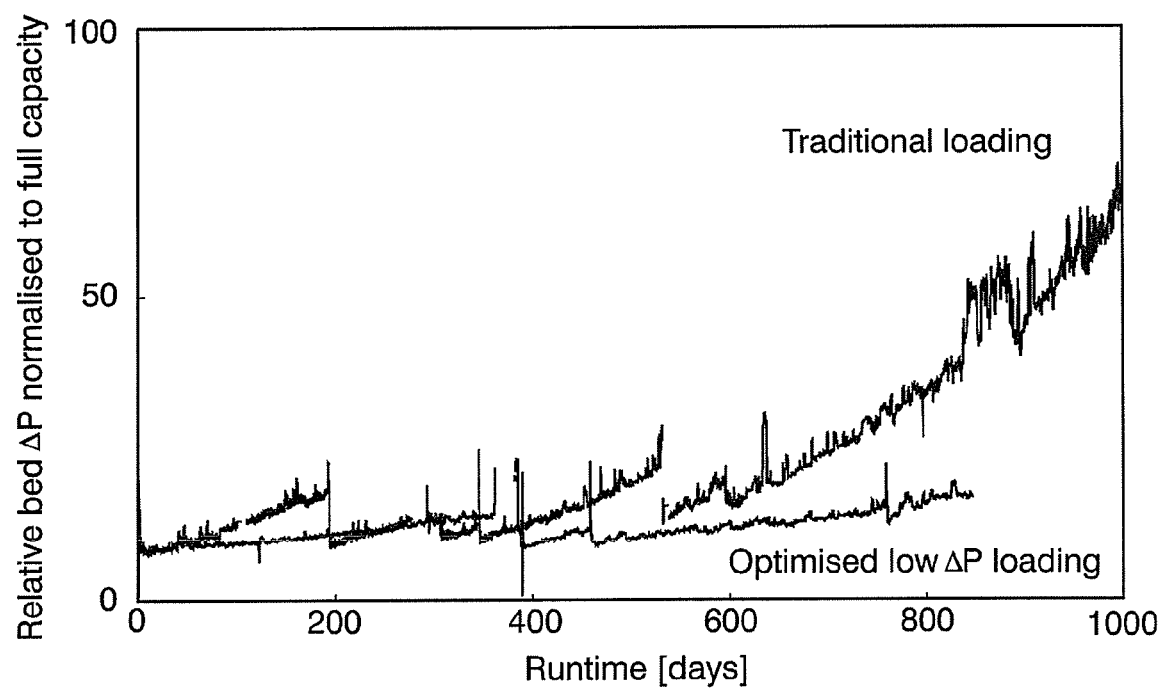
FIG. 5 shows the effect of catalyst loading according to the invention in an industrial autothermal reformer operating at a steam-to-carbon ratio of 0.60. Lowest operation line:pressure drop according to present invention.

Reference is given to FIG. 5. Here the effect of the loading according to the invention in an industrial autothermal reformer operating at a steam-to-carbon ratio of 0.60 is shown. The improved catalyst loading in which the top and second layers are in the form of ring shaped catalysts significantly reduces the rate of pressure drop increase. The deposition of alumina vapour on the catalyst is thus mitigated to such an extent that pressure drop is kept low or at least significantly reduced. The operating conditions of an autothermal reformer running at a steam-to-carbon ratio of 0.60 are especially demanding as the low steam-to-carbon ratio implies higher temperatures in the combustion chamber.

What is claimed is:

1. Egg-shell catalyst consisting of an active compound in the form of an alloy of nickel and one of iridium and ruthenium, on a support comprising alumina, zirconia, magnesia, titania, or combinations thereof, wherein the concentration of iridium or ruthenium is significantly different towards external surfaces of the catalyst than in rest of catalyst body.

2. Catalyst according to claim 1 wherein the content of iridium or ruthenium in the catalyst is in the range 0.01 to 0.5 wt % and the nickel content in the catalyst is 2 to 16 wt %.

3. Catalyst according to claim 1, wherein the catalyst is cylindrically shaped and has one or more through holes, where the distance from the center to the external surface of the catalyst is 10 to 40 mm, the height of the catalyst is 10 to 40 mm and the diameter of the one or more through holes is 3 to 30 mm.

4. Catalyst according to claim 1, wherein the active compound is an alloy of nickel and iridium, or nickel and ruthenium, and at least 90 wt % of the iridium or ruthenium in the catalyst is located in an outer shell having a depth of up to 10% from the external surface of the catalyst or up to 10% from the periphery of the one or more through holes of the catalyst.

5. Method of producing the catalyst of claim 1 comprising the steps of: (a) providing nickel into a support comprising alumina, zirconia, magnesia, titania, magnesium-aluminium spinel or combinations thereof; (b) adding iridium or ruthenium to the catalyst of step (a) by an impregnation with an aqueous solution of $IrCl_3.H_2O$ or iridium acetate or $Ru(NO_3)_3NO$, whereby the concentration of iridium or ruthenium is significantly different towards external surfaces of the catalyst than in the rest of catalyst body.

6. Method according to claim 5, wherein step (a) comprises the step of impregnating the support with nickel and then drying and calcining, where the calcination is conducted at 400-600° C. in air.

7. Method according to claim 6, wherein the support comprises alumina or magnesium-aluminium spinel.

8. Method according to claim 7, wherein the support comprises α-alumina.

\* \* \* \* \*